United States Patent
Meier et al.

(10) Patent No.: US 8,165,534 B2
(45) Date of Patent: Apr. 24, 2012

(54) UNSCHEDULED PROTOCOLS FOR SWITCHED ANTENNA ARRAYS

(75) Inventors: Robert Meier, Cuyahoga Falls, OH (US); Stephen Saliga, Akron, OH (US); Johannes Kruys, Harmelen (NL); David Petsko, Richfield, OH (US)

(73) Assignee: Cisco Technology, Inc., San Jose, CA (US)

( * ) Notice: Subject to any disclaimer, the term of this patent is extended or adjusted under 35 U.S.C. 154(b) by 924 days.

(21) Appl. No.: 12/180,710

(22) Filed: Jul. 28, 2008

(65) Prior Publication Data
US 2010/0022261 A1 Jan. 28, 2010

(51) Int. Cl.
*H04B 1/38* (2006.01)
*H04B 1/00* (2006.01)
(52) U.S. Cl. .................. 455/73; 455/78; 455/63.4
(58) Field of Classification Search ............ 455/517, 455/518, 507, 509, 512, 434, 435.2, 562.1, 455/575.7, 73, 63.4, 78; 370/445, 458
See application file for complete search history.

(56) References Cited

U.S. PATENT DOCUMENTS

| | | | | |
|---|---|---|---|---|
| 6,434,112 | B1 * | 8/2002 | Kwon | 370/216 |
| 7,522,934 | B2 * | 4/2009 | Fukuda | 455/522 |
| 7,826,457 | B2 * | 11/2010 | Bennett et al. | 370/394 |
| 2007/0230418 | A1 * | 10/2007 | Takeuchi et al. | 370/338 |
| 2008/0268778 | A1 * | 10/2008 | De La Garrigue et al. | 455/41.2 |
| 2009/0232042 | A1 * | 9/2009 | Kneckt et al. | 370/312 |

* cited by examiner

*Primary Examiner* — Sonny Trinh
(74) *Attorney, Agent, or Firm* — Tucker Ellis LLP

(57) ABSTRACT

In an example embodiment, an apparatus, comprising a first wireless transceiver, a first directional antenna coupled to the first wireless transceiver, a second wireless transceiver, a second directional antenna coupled to the second wireless transceiver, and control logic coupled to the first wireless transceiver and the second wireless transceiver. The first wireless transceiver and second wireless transceiver can concurrently receive wireless signals that are spatially separated. The first wireless transceiver asserts a signal while communicating with another wireless device. The control logic is configured to prevent the second wireless transceiver from transmitting while the first wireless transceiver is asserting the signal.

24 Claims, 8 Drawing Sheets

UNSCHEDULED PROTOCOLS FOR SWITCHED ANTENNA ARRAYS

TECHNICAL FIELD

The present disclosure relates generally to wireless communications such as wireless mesh access point backhaul communications.

BACKGROUND

Root Access Points (APs) are connected to the network infrastructure via an Ethernet link. Non-root "child" APs are connected to a root or non-root "parent" AP over an 802.11 "backhaul" radio link. A parent AP uses a "downlink" radio and corresponding downlink antenna to communicate with child radios; a child AP uses an "uplink" radio and corresponding uplink antenna to communicate with a parent radio in a parent AP. A non-root AP may use a single "uplink/downlink" radio to both communicate with its parent and with its children.

An "antenna scheduling problem" is introduced if parent and child mesh radios are connected via switched sector antenna arrays. The parent and child radios must agree on "rendezvous times," when both the parent and child radio transceivers are connected to the pair of sector antennas that provide the parent/child link. A fixed-time-slot protocol can be used to resolve the antenna scheduling problem. A parent radio establishes a schedule in which it visits each sector antenna in the array for a fixed time slot. A fixed-time-slot protocol, however, introduces an "idle slot problem," in which time slots are completely or partially unused. For example, consider a transient condition in which a station is sending a large file (e.g. over a single backhaul antenna) and all other stations are temporarily idle. In such a scenario, a fixed-time-slot protocol effectively reduces the available bandwidth by a factor equal to the number of antennas. For example, if 8 fixed time slots are allocated to 8 antennas, then only $1/8^{th}$ of the bandwidth can be used for the file transfer. Moreover, it is difficult to use an entire fixed time slot, because a radio cannot initiate a frame transmission if it cannot be completed within the fixed time slot (i.e. without losing the frame). The problem can be partially resolved by "fragmenting" transmissions; however, fragmentation adds significant additional overhead, e.g. for the per-fragment preamble in physical layer/media access control layer (PHY/MAC) headers and per-fragment Frame Check Sequence (FCS) values. A "variable-time-slot protocol" can be used to partially resolve the "idle slot problem." Instead of scheduling fixed time slots per antenna, a parent radio can schedule variable time slots that are adapted to the offered load on each antenna. In order to maintain a variable schedule, the variable-time-slot protocol is relatively complex and "chatty." A parent radio must constantly send frames on both active and idle antennas so that child radios can maintain synchronization with the variable antenna schedule. In addition, bandwidth is wasted if a parent radio and child radios cannot agree on accurate rendezvous times.

A co-located radio coordination problem is introduced if a first radio and a second radio are "co-located." Herein, two radios are "co-located" if the radios are contained in the same device (e.g. 802.11 access point) and operate on radio frequencies that are not widely separated. If a first radio transmits at the same time that a second co-located radio is receiving a frame, the frame reception on the second radio will be corrupted. If a first radio transmits at the same time that a second co-located radio is transmitting a frame, the frame transmissions may or may not be corrupted at the respective receivers, depending upon conditions such as the spatial separation of the receivers and the transmit antenna patterns.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
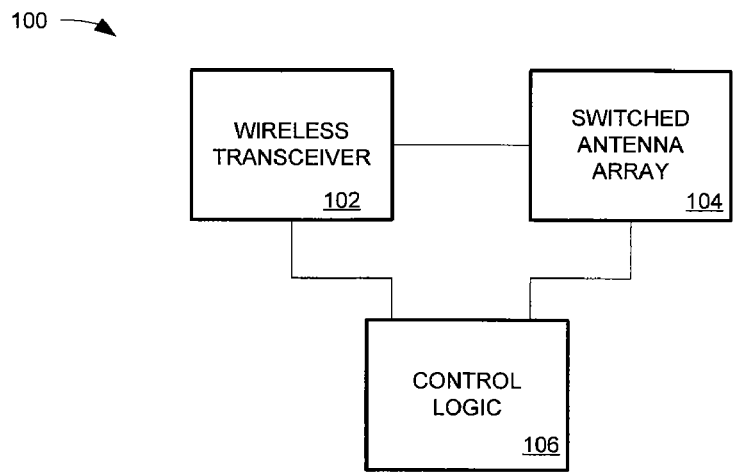
FIG. 1 is a block diagram of a wireless transceiver coupled to a switched antenna array.

The following presents a simplified overview of the example embodiments in order to provide a basic understanding of some aspects of the example embodiments. This overview is not an extensive overview of the example embodiments. It is intended to neither identify key or critical elements of the example embodiments nor to delineate the scope of the appended claims. Its sole purpose is to present some concepts of the example embodiments in a simplified form as a prelude to the more detailed description that is presented later.

Described in example embodiments herein are techniques for operating wireless devices employing a switched antenna array. The switched antenna array may suitably comprise one of the following: an omni-directional antenna and one or more directional antennas coupled to a single transceiver; a plurality of directional antennas coupled to a single transceiver; or a plurality of wireless transceivers coupled to directional antennas. Protocols described in example embodiments herein enable apparatuses employing switched antenna arrays to perform unscheduled communications.

In accordance with an example embodiment, there is disclosed herein an apparatus comprising a wireless transceiver, an antenna array coupled to the wireless transceiver, and control logic operable to control the operation of the wireless transceiver and the antenna array. In one embodiment, the antenna array comprises an omni-directional antenna and at least one narrow-beam sector antenna. The control logic is configured to couple the omni-directional antenna to the wireless transceiver so as to receive a reservation frame from a peer wireless transceiver while at least one directional antenna is idle. The control logic is configured to determine a directional antenna selected from the at least one directional antenna to employ so as to communicate with the peer wireless transceiver. The control logic sends a poll frame to the peer wireless transceiver to initiate communications with the peer wireless transceiver. To compensate for the relatively lower antenna gain of the omni-directional antenna, reservation frames may be sent at a lower data rate; other frames sent in the communications exchange on a directional antenna may be sent at a higher data rate.

In accordance with another example embodiment, there is disclosed herein an apparatus comprising an antenna array, a wireless transceiver, and control logic operable to control the operation of the wireless transceiver and the antenna array. The antenna array comprises a plurality of directional antennas, each of the plurality of directional antennas further comprising receive logic. The control logic is configured to operate the wireless transceiver in a listen mode, in which each antenna simultaneously listens for a start of a radio transmission. The control logic is further configured to operate in an active mode to couple the wireless transceiver to a selected antenna of the plurality of directional antennas responsive to receive logic on the selected antenna detecting a start of frame reception on the selected antenna.

In accordance with another example embodiment, there is disclosed herein an apparatus comprising a first wireless transceiver, a first directional antenna coupled to the first wireless transceiver, a second wireless transceiver, a second directional antenna coupled to the second wireless transceiver, and control logic coupled to the first wireless transceiver and the second wireless transceiver. The first wireless transceiver and second wireless transceiver can concurrently receive wireless signals that are spatially separated. The first wireless transceiver asserts a signal while communicating with another wireless device. The control logic is configured to prevent the second wireless transceiver from transmitting while the first wireless transceiver is asserting the signal.

In accordance with an example embodiment, there is disclosed herein a method comprising receiving a frame by a first wireless transceiver belonging to a coordinated radio group. The first wireless transceiver asserts a signal to other wireless transceivers belonging to the coordinated group, indicating a frame is being received by the first wireless transceiver. The other wireless transceivers belonging to the coordinated radio group defer transmission until the signal is de-asserted.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Described herein in example embodiments are three switched sector antenna arrays—a dumb "uni-listen" array, a semi-smart "multi-listen" array, and a smart "multi-receive" array—and antenna-aware protocols such as MAC (Media Access Control) protocols. A first MAC protocol requires minimal changes to the existing 802.11 DCF/EDCA (Distributed Coordination Function/Enhanced Distributed Channel Access) MAC compatible protocol. In other example embodiments, a reservation/polling protocol is described. Neither the simple protocol nor the reservation/polling protocol requires time-based antenna scheduling. Both protocols can work with the uni-listen antenna array, the multi-listen antenna array, or the multi-receive antenna array.

In an example embodiment disclosed herein, a switched antenna array is employed that is a dumb Uni-listen Sector Antenna Array comprised of a set of N (where N is an integer greater than zero) narrow-beam sector antennas and a single omni antenna. The omni antenna and sector antennas are attached to the radio transceiver via a hardware switch. The radio "listens" for reservations on the omni antenna and communicates with peer radios on the sector antennas. At any given time, only one "active" antenna is attached to the radio transceiver. Logic such as software selects the active antenna.

In an example embodiment disclosed herein, a semi-smart Multi-Listen Sector Antenna Array that is comprised of a set of N narrow-beam sector antennas coupled to a wireless transceiver is employed. Each antenna is equipped with receive logic such that each antenna can simultaneously "listen" for the start of a radio transmission. At any given time, the wireless transceiver is connected to one of the N directional antennas through a switch. A radio and the N directional antennas operate in one of two modes. In Active Mode, the wireless transceiver is directly connected to one of its N antennas. In Listen Mode, the AP radio is effectively "listening" to all N of its directional antennas, at the same time; the radio transceiver is disconnected from the antenna array while receive logic in each antenna listens for a received frame, and an antenna is automatically connected to a transceiver when the start of a frame reception is detected on the antenna.

In an example embodiment disclosed herein, a wireless transceiver comprises a coordinated radio group that is comprised of a set of one or more narrow-beam sector antennas and wireless, such as radio, transceivers. Each antenna is attached to a separate wireless transceiver such that frames can be received and, optionally, transmitted on multiple antennas simultaneously. If a radio group is comprised of more than one radio, then radio coordination logic is used to coordinate the operation of the radio transceivers.

In an example embodiment, a radio transceiver asserts a receiver busy (RX_Busy) signal when it is actively receiving a "useful" frame directed to the respective radio. Other radios in the coordinated radio group defer new transmissions when the RX_Busy signal is asserted. A radio transceiver does not assert the RX_Busy signal when it is receiving a "useless" frame that is not directed to the respective radio. A radio can optionally initiate a highest-priority transmission when RX_Busy is asserted. As used herein, a frame reception is "useful" if it is directed to a unicast or multicast address (such as a MAC address) of the respective radio. To prevent other transceivers from deferring needlessly, a radio transceiver de-asserts RX_Busy when it is not receiving useful frames. In an example embodiment, a receiver immediately asserts RX_BUSY whenever it starts receiving an 802.11 frame. The receiver can de-assert RX_BUSY if it detects that the frame is useless (not addressed to the receiver). In another example embodiment, a receiver asserts RX_BUSY when it determines that a frame reception is useful.

In a single radio group, a "local collision" occurs when a first radio transmits a frame that destroys a "useful" active frame reception on a different radio transceiver. The number of such local collisions and/or the transmitter deferral time can be reduced by decreasing the "RX_Busy detect time," i.e. the time from the start of a frame reception until the frame is detected as useful. A transmitting radio can optionally insert a peer radio ID or BSS multicast group ID in the preamble or PHY header of a transmitted frame such that a target receiver can quickly detect that the frame is useful.

A Service Period is a bi-directional communication exchange between two wireless devices, such as a parent and child radio. In an example embodiment, one Service Period at most can be active on any one radio in a radio group at a given time. In one embodiment, a radio acquires a Service_Period semaphore before it initiates a Service Period. If a radio has acquired the Service_Period semaphore, then another radio in the same radio group cannot obtain a Single_Frame_Transmit semaphore (see below) or assert the RX_Busy signal. In particular embodiments, requests for the Service_Period semaphore are prioritized and are granted in priority order. In at least one embodiment, only a highest-priority request is granted a Service_Period semaphore if RX_Busy is asserted.

In an example embodiment, a wireless transceiver acquires an optional Single_Frame_Transmit semaphore before it initiates an unacknowledged uni-directional frame transmission (for example, a multicast transmission). One or more radios per radio coordination group can acquire the Single_Frame_Transmit semaphore simultaneously. The Single_Frame_Transmit semaphore is not needed if all radios in a radio group can transmit simultaneously.

In example embodiments described herein, each of the sector antennas in an antenna array is assigned with an unique antenna ID. The antenna ID is advertised in 802.11 Beacon, Probe, Authentication, Association, and Re-association frames. In a simple implementation, the antenna ID is a standard 802.11 BSSID.

In an example embodiment, each radio in a coordinated radio group effectively functions as an independent 802.11 BSS. Each downlink radio transceiver in an "attached" parent AP sends periodic (e.g. 802.11) Beacon frames on its attached sector antenna. An "unattached" radio must scan for a potential parent radio on each of its uplink antenna candidates. A child radio discovers a parent radio and determines the best sector antenna for the parent radio from beacons or other messages received from the parent radio. A child radio explicitly associates with a parent radio. A parent radio "learns" the sector antenna for a child radio when the child radio associates.

A child radio is constantly "listening" for its parent whenever it is not busy transmitting. Likewise, a parent radio is constantly listening for all of its children. Therefore, no scheduler is needed to establish antenna rendezvous times. A first radio can transmit to another peer radio at any time.

Non-Polled Contention Based Protocol.

In an example embodiment, radios in a radio group employ a delayed acknowledgement mechanism (for example, both the 802.11e and 802.11n standards specify delayed acknowledgement mechanisms) to acknowledge a communication reception. Delayed acknowledgements are employed because a radio in a radio coordination group may not be able to immediately acknowledge a received frame if another radio in the same group has acquired the Service_Period semaphore or asserted RX_Busy. A sender must retransmit a unicast frame if it does not receive a possibly delayed acknowledgement within a predefined (DELAYED_ACK_TIMEOUT) time period.

In an example embodiment, standard Request to Send/Clear To Send (RTS/CTS) mechanisms are employed for channel access. A radio acquires the single Service_Period semaphore before sending an RTS or CTS frame. Within a single radio group, a local collision occurs when one radio receives a frame on one antenna while a different radio is actively transmitting on a different antenna. Such local transmit/receive collisions result in corrupted frame receptions. To avoid long local collisions, the RTS/CTS threshold should be set to a relatively low value (i.e. 100 bytes) such that the transmission of a large frame is preceded by an RTS/CTS exchange.

In an example embodiment, radios implement an Enhanced RTS/CTS mechanism as follows. A standard 802.11 radio must send a CTS frame an SIFS (short interframe space) time after it receives an RTS frame. A radio in a coordinated radio group cannot send a CTS frame within an SIFS time if it cannot immediately acquire the Service_Period semaphore. With the enhanced mechanism, a radio can send a CTS frame at any time to indicate that it is ready to receive a frame. An Enhanced RTS frame (E-RTS) contains a priority value, which is used to schedule Service Periods in priority order. For example, multiple radios in a radio group may simultaneously receive multiple E-RTS frames. The E-RTS priority values facilitate priority scheduling for the corresponding CTS transmissions and Service Periods. In an example embodiment, radios employ a fragmentation mechanism, such as the standard 802.11 fragmentation mechanism.

The operation of the protocol varies depending upon the antenna capabilities of a parent/child radio pair. Therefore, parent and child radios exchange antenna and protocol capabilities when the child radio first associates to the parent radio.

Reservation/Polling Protocol.

In an example embodiment, parent/child radios employ a master/slave reservation/polling protocol that is based on a simple subset of the standard Institute of Electrical and Electronic Engineers (IEEE) 802.11e master/slave Hybrid Contention-Controlled Access (HCCA) protocol. For example, a parent radio can use a technique for gaining priority access to a channel (for example, by waiting a shorter time period to contend for the channel) before sending poll frames to child radios. For example, a Backhaul Basic Service Set (BBSS) is comprised of a single parent "downlink" radio and one or more child "uplink" radios. A parent radio, using higher priority access, gains control of the channel and "polls" child radios to solicit uplink transmissions. Child radios send reservation frames to solicit polling by the parent radio.

A "reservation" frame is an E-RTS frame or any 802.11e frame that contains a non-zero 802.11e queue-state value. A "poll" frame is any of the 802.11e poll frame types. Note that a poll can be piggybacked onto a data and/or ACK frame; an ACK can be piggybacked onto a data and/or or poll frame. A "data" frame may be comprised of a single higher-layer packet or multiple "aggregated" higher-layer packets. A reservation frame contains a priority value, which is used to establish a priority for a corresponding unscheduled service period. A coordinated radio group in a parent AP may have multiple pending service periods. A parent AP generally prioritizes Service Periods as follows:

1) Scheduled Service Periods generally have a higher priority than unscheduled Service Periods. [For example, the IEEE 802.11e specification defines Scheduled Service Periods and Unscheduled Service Periods.]

2) The priority of an unscheduled Service Period initiated by a child radio is a function of the priority value contained in the corresponding reservation frame.
3) The priority of an unscheduled Service Period initiated by a parent radio is a function of the priority value assigned to a corresponding downlink data frame.

A combination of strict priority queuing and weighted-fair queuing can be used to schedule service periods for a single radio. Requests and corresponding grants for the Service_Period semaphore can be prioritized to facilitate prioritized Service Period scheduling across multiple radios in a coordinated radio group. [Note that scheduled antenna rendezvous times are not needed to facilitate Scheduled Service Periods in any of the antenna array embodiments described above.]

Channel access logic operates independently in each radio in a coordinated radio group. Therefore, the channel may be "busy" in a first radio and "idle" in a second radio in the same radio group. A radio cannot obtain the Service_Period semaphore until its radio channel is idle. The method increases spatial reuse, because a radio can obtain the Service_Period semaphore when the channel is busy on a different radio in the coordinated group.

In a scheduled or unscheduled service period, a parent radio sends poll frames, which may be piggybacked on a data/ACK frames, to a child radio. A child radio can respond to a poll by transmitting a data frame and/or ACK frame. A child radio can set the "queue size" field in a data frame so as to solicit successive polls from its parent. The parent radio ends a service period by sending a non-poll frame to the child radio.

A parent radio establishes the schedule for scheduled service periods, as in 802.11e, by sending "Schedule" messages to child radios. Scheduled service periods can begin at fixed TSF timer intervals (where the standard TSF timer is a distributed clock shared by a parent radio and its child radios). A parent radio acquires the channel and sends an "unsolicited" poll frame to a child radio at the start of each scheduled service period. A child radio, which is a member of a coordinated radio group, acquires the Service_Period semaphore prior to the start of each of its scheduled service periods so that it can immediately respond to a poll frame.

Frame exchanges for two example scheduled service periods are shown below. In each exchange, a channel access is only performed by the parent radio prior to the transmission of the first poll frame.

Scheduled Service Period (No Data):

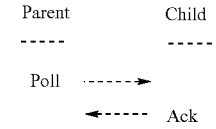

Scheduled Service Period (Bi-Directional Data):

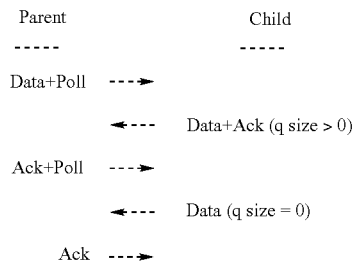

A parent radio can initiate an unscheduled downlink service period at any time. A parent AP can precede an unscheduled downlink service period with an RTS/CTS exchange.

A child radio can initiate an unscheduled service period by sending a reservation frame to its parent radio. When a parent radio receives a reservation frame, it schedules the respective child radio for polling. After sending a reservation frame, a child radio retains the Service_Period semaphore such that it can immediately respond to a poll frame. A child radio retransmits a reservation frame if it is not polled within a POLL_TIMEOUT time period.

Frame exchanges for two example unscheduled service periods are shown below:

Unscheduled Service Period Initiated by the Parent Radio:

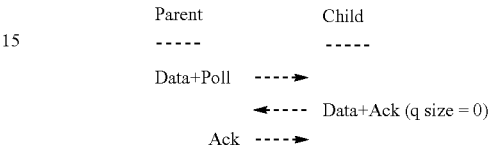

Multiple Unscheduled Service Periods Initiated by Child Radios:

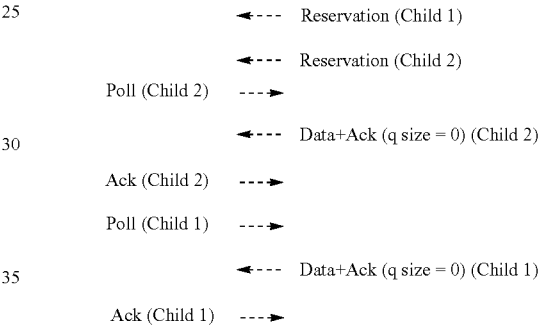

The methods described herein obviate the need for a time-based antenna scheduler and, therefore, avoid the problems associated with antenna scheduling. The methods are suitable for use with narrow-beam sector antennas. Narrow-beam sector antenna gain significantly increases the operational range of radios. Sector antennas increase "spatial reuse," such that the total available bandwidth in a given area is greatly increased. Sector antennas reduce contention and the percentage of hidden nodes. Radio coordination enables multiple radios, such as radios in the same access point (AP), to operate on the same radio channel with minimal interference. In the multi-receive embodiment, a wireless device such as an AP can simultaneously receive multiple reservations and/or short non-polled frames on multiple antennas. Because interactive voice frames are short, a child radio can send latency-sensitive voice frames without waiting for a poll. The methods described herein enable an AP to simultaneously transmit multiple unacknowledged frames on multiple antennas at the same time.

FIG. 1 is a block diagram of an apparatus 100 configured in accordance with an example embodiment. Apparatus 100 comprises a wireless transceiver 102 coupled to switched antenna array 104. Control logic 106 controls the operation of wireless transceiver 102 and/or switched antenna array 104. "Logic," as used herein, includes but is not limited to hardware, firmware, software, and/or combinations of each to perform a function(s) or an action(s) and/or to cause a function or action from another component. For example, based on a desired application or need, logic may include a software controlled microprocessor, discrete logic such as an application-specific integrated circuit (ASIC), a programmable/programmed logic device, memory device containing instructions, or the like, or combinational logic embodied in hardware. Logic may also be fully embodied as software.

In an example embodiment, wireless transceiver 102 is suitably any transceiver capable of sending and/or receiving wireless signals. For example, wireless transceiver 102 may be configured to send/receive electromagnetic, radio frequency (RF), optical, and/or Infra red (IR) signals. In particular embodiments, wireless transceiver 102 comprises a plurality of wireless transceivers, such as two or more RF transceivers.

Switched antenna array 104 is suitably any appropriate antenna configuration for sending/receiving signals employed by wireless transceiver 102. For example, referring to FIG. 2 with continued reference to FIG. 1, there is illustrated an apparatus 200 with a switched antenna array 104 comprising a 360 degree omni-directional, or "omni," antenna 202 and one or more unidirectional, or "sector," antennas 204. A switch 206 is used to couple either the omni antenna 202 or the directional antennas 204. Control logic 106 controls switch 206 to couple wireless transceiver 102 to either the omni antenna 202 or the directional antennas 204.

Figure 2:
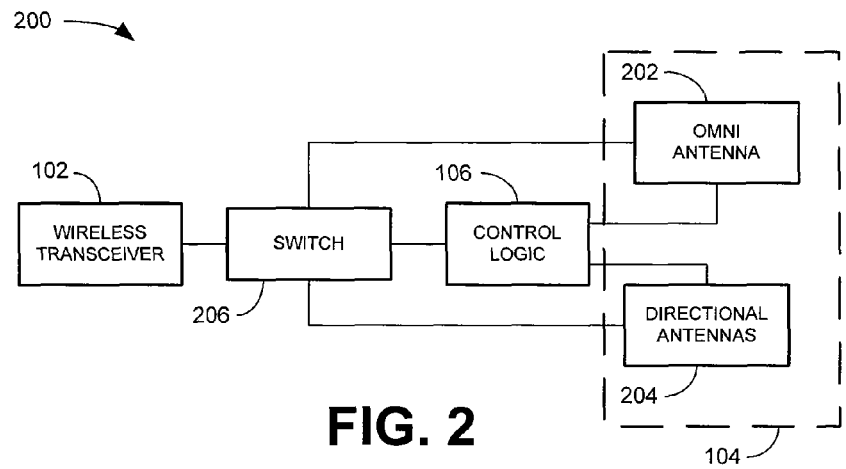
FIG. 2 illustrates an example of apparatus employing an Omni antenna and at least one directional antenna.

In the example embodiment of FIG. 2, reservation frames are received on omni antenna 202. Because the antenna gain on omni antenna 202 may be less than the gain of directional antennas 204, reservation frames received on omni antenna 202 may be received at a lower data rate than the frames received on directional antennas 204. The data rate of frames received on omni antenna 202 may also be a function of signal strength or signal quality (e.g. bit error rate "BER" or signal-to-noise "SNR" ratio). Moreover, a wireless device communicating with omni antenna 202 may use 'ranging' or other techniques to select a data rate.

In an example embodiment, the reservation frame is a request to send (RTS) frame. Wireless transceiver 102 may send a response on either omni antenna 202 or select a directional antenna from directional antennas 204 for sending the response. In an example embodiment, the response to the RTS is a clear to send (CTS) frame. In another example embodiment, a poll frame is sent in lieu of a clear to send frame.

In an example embodiment, the control logic 106 is configured to periodically send a beacon frame on each of the directional antennas belonging to directional antennas 204. The beacon frame comprises an antenna identifier identifying the directional antenna transmitting the beacon frame. In particular embodiments, the beacon further comprises data identifying a small beacon contention period for each antenna belonging to directional antennas 204. The wireless transceiver 102 listens on a directional antenna for the beacon contention period following the transmission of a beacon on the directional antenna.

Figure 3:
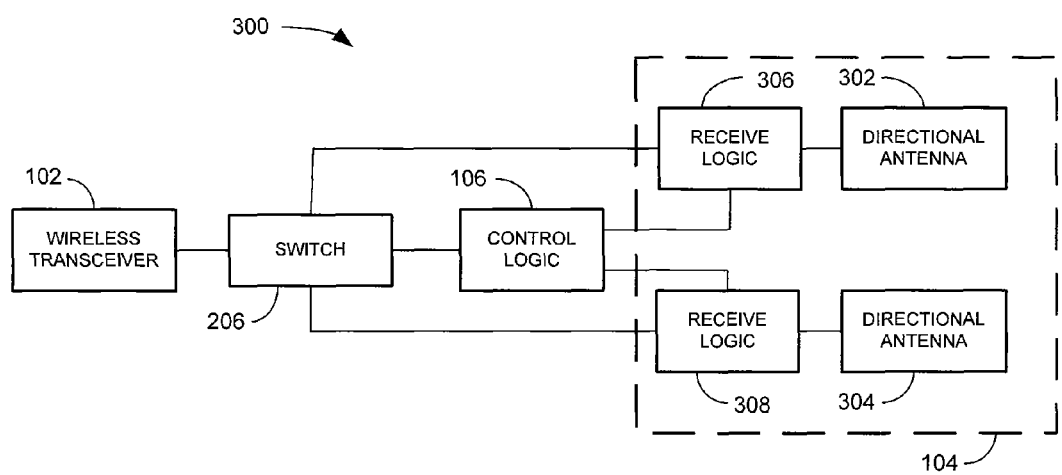
FIG. 3 illustrates an example of an apparatus with a switched antenna array comprising a set of N directional antennas.

In another example embodiment, switched antenna array 104 is comprised of multiple directional antennas. For example, FIG. 3 illustrates an example of an apparatus 300 with a switched array 104 with multiple directional antennas 302, 304. Switched antenna array 104 can be comprised of a set of N narrow-beam sector antennas, where N is an integer greater than 1. For example, in FIG. 3 N would be equal to 2. N may be as low as 2 and as large as is physically realizable. For example, each antenna 302, 304 is equipped with receive logic 306, 308, respectively, such that each antenna 302, 304 can simultaneously "listen" for the start of a radio transmission. At any give time, wireless transceiver 102 is connected to one of the N directional antennas through switch 206. Wireless transceiver 102 and the N directional antennas operate in one of two modes: Active Mode and Listen Mode. In Active Mode, wireless transceiver 102 is directly connected to exactly one of its N antennas. In Listen Mode, wireless transceiver 102 is effectively "listening" to all N of its directional antennas at the same time; in other words, wireless transceiver 102 is disconnected from switched antenna array 104. RX Detect Logic in each antenna listens for a received frame, and an antenna is automatically connected to wireless transceiver 104 by control logic 106 when the start of a frame reception is detected on the antenna.

In an example embodiment, control logic 106 is configured to determine whether the frame received on one of antennas 302, 304 is a reservation frame. Control logic 106 is responsive to determining the frame received is a reservation frame to send a responsive confirmation of a reservation on the antenna receiving the frame. In an example embodiment, in which the reservation frame is a request to send (RTS) frame, control logic 106 responds with a clear to send (CTS) frame. In another example embodiment, control logic 106 confirms the reservation frame by sending a poll frame to initiate communication with a wireless transceiver sending the request to send frame.

In an example embodiment, control logic 106 is configured to periodically send a beacon frame on each of the plurality of directional antennas 302, 304. In particular embodiments, the beacon frame comprises an antenna identifier for identifying the antenna on which the beacon frame was transmitted.

Figure 4:
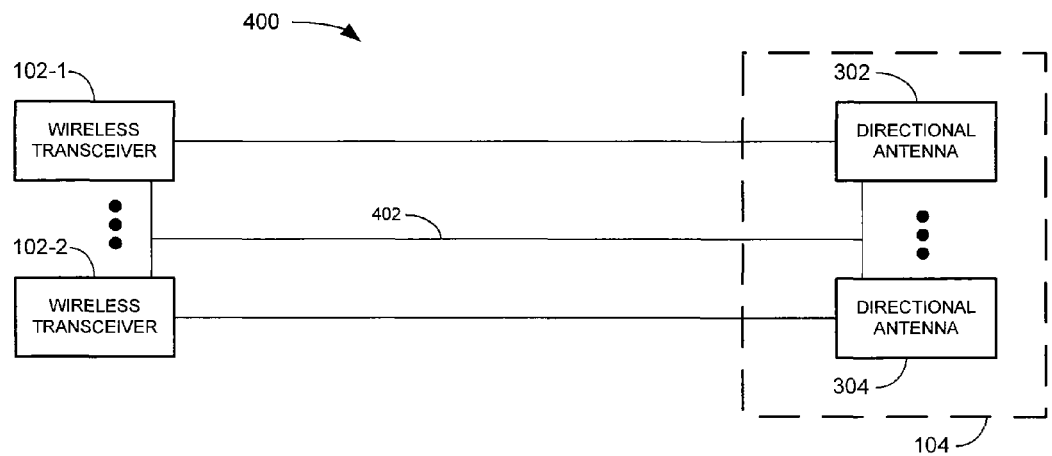
FIG. 4 illustrates an example of an apparatus with a switch antenna array comprising multiple wireless transceivers coupled to directional antennas.

In an example embodiment, switched antenna array 104 comprises a plurality of directional antennas 302, 304, each antenna being coupled to a different wireless transceiver 102. For example, FIG. 4 shows an example embodiment 400 with multiple wireless transceivers 102. In the example embodiment 400 illustrated in FIG. 4, directional antennas 302, 304 can notify transceivers 102-1, 102-2 when they are receiving a useful frame and wireless transceivers 102-1, 102-2 communicate with each other for reserving times for transmission. In the example embodiment 500 illustrated in FIG. 5, control logic 106 is configured between antennas 302, 304 and wireless transceivers 102. Control logic 106 can handle reservations; for example, by notifying wireless transceivers when an antenna is receiving a useful frame or by employing semaphores for reserving times for transmission.

Figure 5:
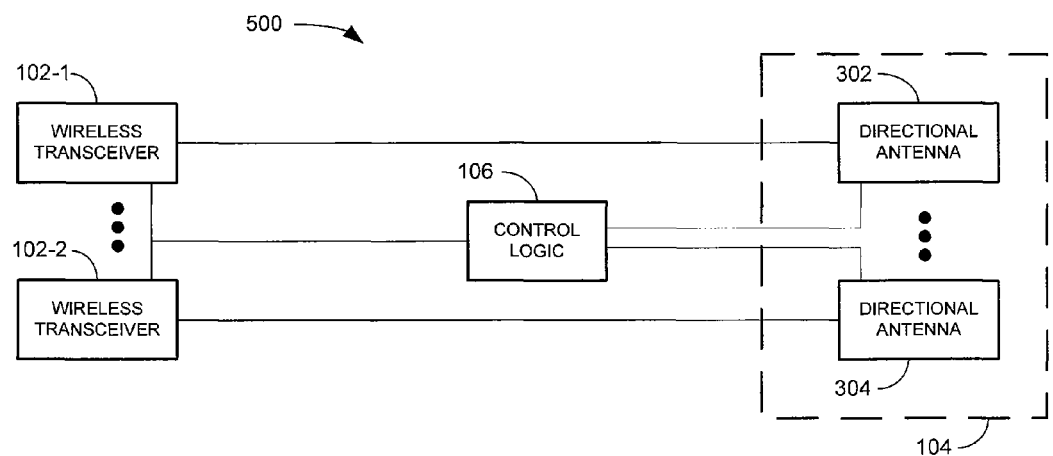
FIG. 5 illustrates another example of an apparatus with a switch antenna array comprising multiple wireless transceivers coupled to directional antennas.

In the example embodiments illustrated in FIGS. 4 and 5, the wireless transceivers 102 can concurrently receive wireless signals on antennas 302, 304 that are spatially separated. A wireless transceiver 102, for example wireless transceiver 102-1, asserts a signal while communicating with another wireless device, either for receiving a signal, sending a signal, or bi-directional communications. Logic, such as control logic 106 or logic incorporated in wireless transceivers 102-1, 102-2, is configured to prevent the second wireless transceiver 102-2 from transmitting while the first wireless transceiver 102-1 is asserting the signal. In an example embodiment, the first wireless transceiver 102-1 and second wireless transceiver 102-2 operate on the same band. Wireless transceivers 102-1, 102-2 are configured to listen for a reservation frame while not communicating with another wireless device. Control logic 106 (or control logic in a wireless transceiver such as wireless transceiver 102-1) is responsive to a reservation frame being received by the first wireless transceiver 102-1 and determining whether the second wireless transceiver 102-2 is idle. A wireless transceiver is "Idle," as used herein, when not communicating with another wireless device, e.g. either sending or receiving data. A wireless transceiver is "active," as used herein, when sending or receiving data. Control logic 106 (or control logic in wireless transceiver 102-1) is configured to enable wireless transceiver 102-1 to respond to the reservation frame while the wireless transceiver 102-2 is idle.

In an example embodiment, wireless transceiver 102-1 sends a poll frame to solicit a transmission from a wireless device. In an example embodiment, a wireless transceiver, e.g. wireless transceiver 102-1, is responsive to receiving a reservation frame that is a request to send (RTS) frame to send a clear to send (CTS) frame in response. In another example embodiment, the wireless transceiver 102 may send a poll in response to the RTS frame. In particular embodiments, the RTS frame comprises data representative of a priority value, enabling control logic 106 to prioritize reservation requests. For example, control logic 106 can sequence polls in response to reservation frames based on priority values contained in the reservation (e.g. RTS) frames. In an example embodiment, the reservation frame contains a transmission opportunity (TXOP) request such as, for example, a TXOP as defined in the Institute of Electrical and Electronic Engineers (IEEE) 802.11 specification.

In an example embodiment, control logic (either control logic 106 or logic in wireless transceiver 102-1) is configured to defer sending an acknowledgement (ACK) to a data frame received by wireless transceiver 102-1 while wireless transceiver 102-2 is actively communicating with another wireless device. The control logic is configured to send a delayed ACK via wireless transceiver 102-1 responsive to the data frame while the second wireless transceiver 102-2 is idle.

In an example embodiment, control logic (either control logic 106 or logic in wireless transceivers 102-1, 102-2) is configured to maintain scheduling data. This enables the control logic to determine when a request to reserve time for communications, such as a request for a Service_Period semaphore, is received to determine whether the request will conflict with a scheduled transmission on another radio or antenna. If another wireless transceiver or antenna already has the time slot reserved, the request is denied. In an example embodiment, the request may be granted if the request has a priority value that meets or exceeds a predetermined threshold. For example, a request may be granted to comply with Quality of Service (QoS) constraints or for other reasons, such as a buffer that is about to overflow.

A non-polled contention-based protocol that can be employed by control logic 106 will now be described. In an example embodiment, radios in a radio group employ a delayed acknowledgement mechanism (for example, both the IEEE 802.11e and IEEE 802.11n standards specify delayed acknowledgement mechanisms) to acknowledge a communication reception. Delayed acknowledgements are employed because a radio in a radio coordination group may not be able to immediately acknowledge a received frame if another radio in the same group has acquired the Service_Period semaphore or asserted RX_Busy. A sender must retransmit a unicast frame if it does not receive a possibly delayed acknowledgement within a predefined (DELAYED_ACK_TIMEOUT) time period.

In an example embodiment, standard Request to Send/Clear To Send (RTS/CTS) mechanisms are employed for channel access. A radio acquires the single Service_Period semaphore before sending an RTS or CTS frame. Within a single radio group, a local collision occurs when one radio receives a frame on one antenna while a different radio is actively transmitting on a different antenna. Such local transmit/receive collisions result in corrupted frame receptions. To avoid long local collisions, the RTS/CTS threshold should be set to a relatively low value (i.e. 100 bytes) so that the transmission of a large frame is preceded by an RTS/CTS exchange.

In an example embodiment, radios implement an Enhanced RTS/CTS mechanism as follows. A standard 802.11 radio sends a CTS frame an SIFS (short inter-frame space) time after it receives an RTS frame. A radio cannot send a CTS frame within an SIFS time if it cannot immediately acquire the Service_Period semaphore. With the enhanced RTS/CTS mechanism described herein, a radio can send a CTS frame at any time to indicate that it is ready to receive a frame. An Enhanced RTS frame (E-RTS) contains a priority value, which is used to schedule Service Periods in priority order. For example, multiple radios in a radio group may simultaneously receive multiple E-RTS frames. The E-RTS priority values facilitate priority scheduling for the corresponding CTS transmissions and Service Periods.

The operation of the protocol varies depending upon the antenna capabilities of a parent/child radio pair. Therefore, parent and child radios exchange antenna and protocol capabilities when the child radio first associates to the parent radio.

In addition to the aforementioned non-polled contention-based protocol, control logic 106 may be configured to operate using the Reservation/Polling Protocol described herein. Control logic 106 may be configured to operate using only the non-polled protocol, only the reservation/poling protocol, or both.

In an example embodiment, parent/child radios employ a master/slave reservation/polling protocol that is based on a simple subset of the standard Institute of Electrical and Electronic Engineers (IEEE) 802.11e master/slave Hybrid Contention-Controlled Access (HCCA) protocol. For example, a parent radio can use a technique for gaining priority access to a channel (for example, by waiting a shorter time period to contend for the channel) before sending poll frames to child radios. For example, a Backhaul Basic Service Set (BBSS) is comprised of a single parent "downlink" radio and one or more child "uplink" radios. A parent radio, using higher priority access, gains control of the channel and "polls" child radios to solicit uplink transmissions. Child radios may send reservation frames to solicit polling by the parent radio.

A "reservation" frame is an E-RTS frame or any 802.11e frame that contains a non-zero 802.11e queue-state value. A "poll" frame is any of the 802.11e poll frame types. Note that a poll can be piggybacked onto a data and/or ACK frame; an ACK can be piggybacked onto a data and/or or poll frame. A "data" frame may be comprised of a single higher-layer packet or multiple "aggregated" higher-layer packets. A reservation frame contains a priority value, which is used to establish a priority for a corresponding unscheduled service period. A coordinated radio group in a parent AP may have multiple pending service periods. A parent AP generally prioritizes Service Periods as follows:

1) Scheduled Service Periods generally have a higher priority than unscheduled Service Periods.
2) The priority of an unscheduled Service Period initiated by a child radio is a function of the priority value contained in the corresponding reservation frame.
3) The priority of an unscheduled Service Period initiated by a parent radio is a function of the priority value assigned to a corresponding downlink data frame.

A combination of strict priority queuing and weighted-fair queuing can be used to schedule service periods for a single radio. Requests and corresponding grants for the Service_P- eriod semaphore can be prioritized to facilitate prioritized Service Period scheduling across multiple radios in a coordinated radio group.

Channel access logic operates independently in each radio in a coordinated radio group. Therefore, the channel may be "busy" in a first radio and "idle" in a second radio in the same radio group. A radio cannot obtain the Service_Period semaphore until its radio channel is idle. The method facilitates spatial reuse, because a first radio can obtain the Service_Period semaphore when the channel is busy on a second radio in the radio group.

In a scheduled or unscheduled service period, a parent radio sends poll frames, which may be piggybacked on a data/ACK frames, to a child radio. A child radio can respond to a poll by transmitting a possibly aggregated data frame and/or ACK frame. A child radio can set the "queue size" field in a data frame to solicit successive polls from its parent. The parent radio ends a service period by sending a non-poll frame to the child radio.

A parent radio establishes the schedule for scheduled service periods, as in 802.11e, by sending "Schedule" messages to child radios. Scheduled service periods can begin at fixed TSF timer intervals (where the standard TSF timer is a distributed clock shared by a parent radio and its child radios). A parent radio acquires the channel and sends an "unsolicited" poll frame to a child radio at the start of each scheduled service period. A child radio, which is a member of a coordinated radio group, acquires the Service_Period semaphore prior to the start of each of its scheduled service periods so that it can immediately respond to a poll frame.

Frame exchanges for two example scheduled service periods are shown below. In each exchange, a channel access is only performed by the parent radio prior to the transmission of the first poll frame.

Scheduled Service Period (No Data):

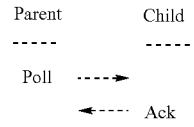

Scheduled Service Period (Bi-Directional Data):

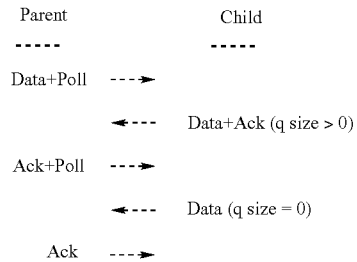

A parent radio can initiate an unscheduled downlink service period at any time. A parent AP can precede an unscheduled downlink service period with an RTS/CTS exchange.

A child radio can initiate an unscheduled service period by sending a reservation frame to its parent radio. When a parent radio receives a reservation frame, it schedules the respective child radio for polling. After sending a reservation frame, a child radio retains the Service_Period semaphore such that it can immediately respond to a poll frame. A child radio retransmits a reservation frame if it is not polled within a POLL_TIMEOUT time period.

Frame exchanges for two example unscheduled service periods are shown below:

Unscheduled Service Period Initiated by the Parent Radio:

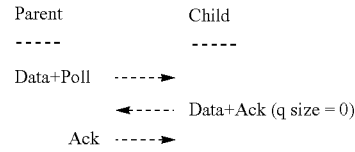

Multiple Unscheduled Service Periods Initiated by Child Radios:

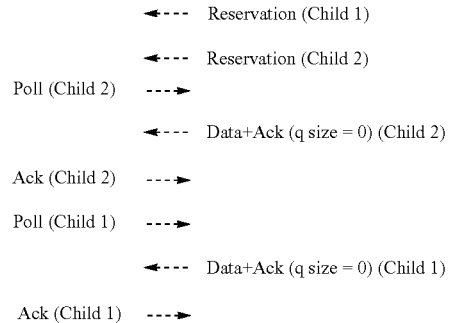

The methods described herein obviate the need for a time-based antenna scheduler and, therefore, avoid the problems associated with antenna scheduling. The methods are suitable for use with narrow-beam sector antennas. Narrow-beam sector antenna gain significantly increases the operational range of radios. Sector antennas increase "spatial reuse," such that the total available bandwidth in a given area is greatly increased. Sector antennas reduce contention and the percentage of hidden nodes. Radio coordination enables multiple radios, such as radios in the same access point (AP), to operate on the same radio channel with minimal interference. A wireless device such as an AP can simultaneously receive multiple reservations and/or short non-polled frames on multiple antennas. Because interactive voice frames are short, a child radio can send latency-sensitive voice frames without waiting for a poll. The methods described herein enable an AP to simultaneously transmit multiple unacknowledged frames on multiple antennas at the same time.

Figure 6:
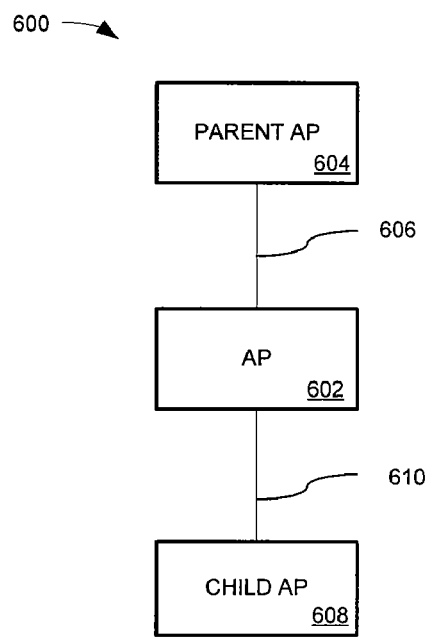
FIG. 6 is a block diagram illustrating an example of a mesh backhaul coupling mesh access points.

FIG. 6 illustrates an example of a mesh network 600 employing a mesh access point (AP) 602 configured in accordance with an example embodiment. Mesh AP 602 may be configured as described herein for any of apparatuses 100, 200, 300, 400 and/or 500. Mesh AP 602 is in communication with a parent AP, AP 604, via a first wireless (parent) link 606. Mesh AP 602 is also in communication with child AP, AP 608, via a second wireless (child) link 610. In an example embodiment, first wireless link 606 and second wireless link 610 utilize the same channel; however, in another example embodiment, first wireless link 606 and second wireless link 610 utilize different channels. For example, in a single backhaul channel implementation, AP 602 is equipped with a single uplink/downlink backhaul radio that provides communications to both AP 604 and AP 608. Using the techniques and protocols described herein, AP 602 is able to perform unscheduled communications with parent AP 604 and/or child AP 608.

For example, a child AP 608 may send a reservation frame (such as an RTS or an RTS with a priority value) to parent AP 602 to solicit a poll. The radio in AP 602 servicing wireless link 610 will assert a signal to prevent the radio servicing wireless link 606 from transmitting while receiving the reservation frame. If the radio servicing link 606 is busy (for example, receiving a frame), AP 602 will defer sending a poll (or other response) until the radio servicing link 606 is done.

Figure 7:
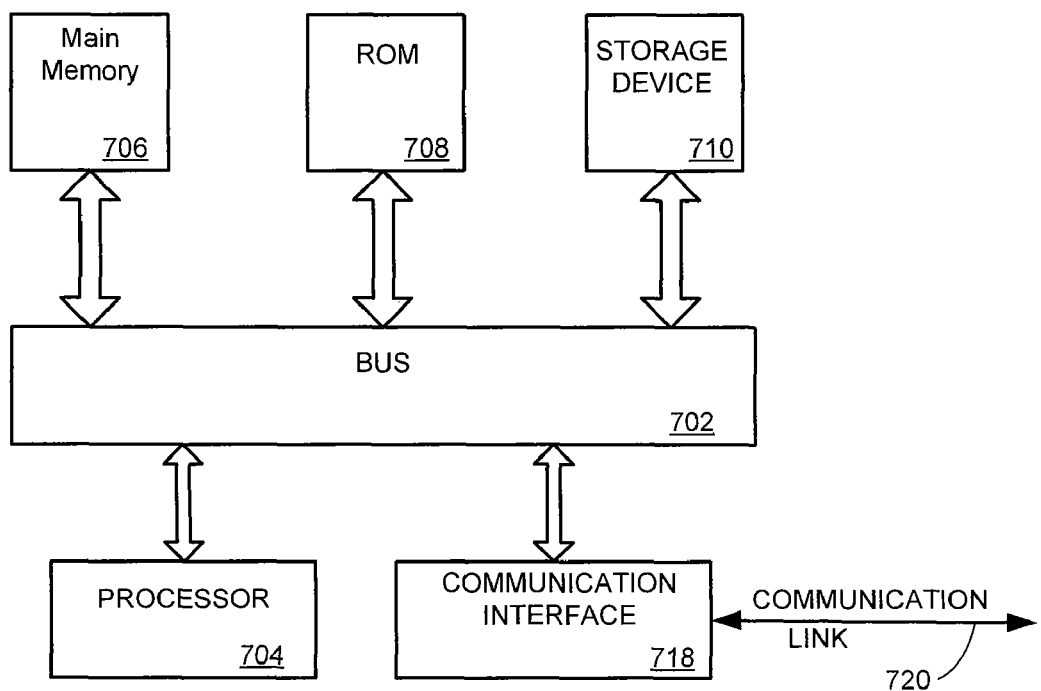
FIG. 7 illustrates a computer system upon which an example embodiment may be implemented.

FIG. 7 is a block diagram that illustrates a computer system 700 upon which an example embodiment may be implemented. Computer system 700 is suitable for implementing control logic 106 described in FIGS. 1-7; receive logic 306, 308 in FIGS. 3-5; and/or logic in wireless transceivers 102-1, 102-2 in FIGS. 4 and 5.

Computer system 700 includes a bus 702 or other communication mechanism for communicating information and a processor 704 coupled with bus 702 for processing information. Computer system 700 also includes a main memory 706, such as random access memory (RAM) or other dynamic storage device, coupled to bus 702 for storing information and instructions to be executed by processor 704. Main memory 706 also may be used for storing a temporary variable or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

An aspect of the example embodiment is related to the use of computer system 700 for implementing unscheduled protocols for switched antenna arrays. According to an example embodiment, implementing unscheduled protocols for switched antenna arrays is provided by computer system 700 in response to processor 704 executing one or more sequences of one or more instructions contained in main memory 706. Such instructions may be read into main memory 706 from another computer-readable medium, such as storage device 710. Execution of the sequence of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement an example embodiment. Thus, embodiments described herein are not limited to any specific combination of hardware circuitry and software.

The term "computer-readable medium," as used herein, refers to any medium that participates in providing instructions to processor 704 for execution. Such a medium may take many forms, including but not limited to non-volatile media, volatile media, and transmission media. Non-volatile media include, for example, optical or magnetic disks such as storage device 710. Volatile media include dynamic memory such as main memory 706. Transmission media include coaxial cables, copper wire, and fiber optics, including the wires that comprise bus 702. Transmission media can also take the form of acoustic or light waves, such as those generated during radio frequency (RF) and infrared (IR) data communications. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD, any other memory chip or cartridge, or any other medium from which a computer can read.

Various forms of computer-readable media may be involved in carrying one or more sequences of one or more instructions to processor 704 for execution. For example, the instructions may initially be borne on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication, coupling computer system 700 to a communication link 720. For example, communication interface 718 is a wireless transceiver, and communication link 720 is a wireless (such as radio frequency "RF," optical, or infra-red "IR") communication link. In any such implementation, communication interface 718 sends and receives electrical, electromagnetic, or optical signals that carry digital data streams representing various types of information.

In view of the foregoing structural and functional features described above, a methodology in accordance with an example embodiment will be better appreciated with reference to FIGS. 8-13. While, for purposes of simplicity of explanation, the methodologies of FIGS. 8-13 are shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an example embodiment. The methodologies described herein are suitably adapted to be implemented in hardware, software, or a combination thereof.

Figure 8:
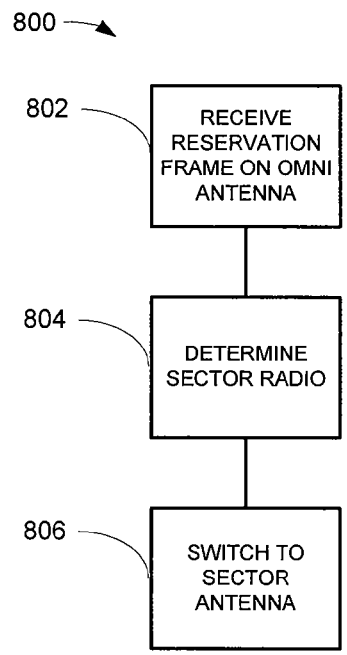
FIG. 8 illustrates a method for operating a wireless transceiver coupled to a switched antenna array comprising an omni-directional antenna and a directional antenna.

FIG. 8 illustrates a method 800 for operating a wireless transceiver coupled to a switched antenna array, comprising an omni-directional antenna and at least one directional antenna. Reservation frames are received on the omni-directional antenna, while bi-directional communications are performed on the at least one directional antenna.

At 802, a reservation frame is received on the omni-directional antenna. The reservation frame may be a RTS frame, which may also include priority data. The reservation frame may be employed for an immediate communication or to schedule a future communication. In an example embodiment, the omni-directional antenna and directional antenna can use the same wireless transceiver. Thus, while the frame is being received on the omni-directional antenna, the wireless transceiver is coupled to the omni-directional antenna. When the wireless transceiver is not performing bi-directional communications on the directional antenna, the wireless transceiver is coupled to the omni-directional antenna to listen for reservation frames.

At 804, the appropriate sector radio for communicating with the wireless device that sent the reservation frame is determined. If the reservation frame contains an antenna identifier for a directional antenna, the directional antenna identified in the reservation frame is used. Otherwise, the directional antenna that is bound to a source radio identifier contained in the reservation frame is used. A parent AP may bind a child radio identifier to a directional antenna during an initial association message exchange. Otherwise, other techniques, such as Angle of Arrival (AOA) or a directional antenna reporting the best Radio Signal Strength Indication (RSSI), Bit Error Rate (BER), and/or Signal to Noise Ration (SNR), can be selected.

At 806, communication is initiated on the selected directional (sector) antenna. In an example embodiment, a response to the reservation frame is sent on the selected directional antenna. The response can be a clear to send (CTS) frame or a poll frame, in accordance with example embodiments described herein. In a single wireless transceiver system, the wireless system is coupled to the selected directional antenna; thus, a signal will not be sent on any other antenna that can interfere with the communications on the selected antenna. In multi-transceiver systems, a signal can be asserted that prevents any interfering transceivers in the same radio group from interfering with communications on the selected antenna.

Figure 9:
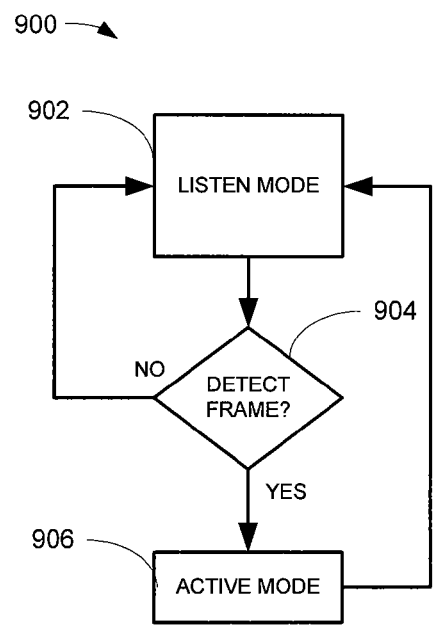
FIG. 9 illustrates a method for operating a wireless transceiver coupled to a switched antenna array comprising a plurality of directional antennas.

FIG. 9 illustrates a method 900 for operating a wireless transceiver coupled to a switched antenna array, comprising a plurality of directional antennas. In an example embodiment, one wireless transceiver is used. An antenna is said to be in active mode when coupled to the wireless transceiver, and in inactive or idle mode when not coupled to the wireless transceiver.

At 902, the system is in listen mode. In listen mode, the plurality of directional antennas listen for frames, such as reservation frames. In particular embodiments, each of the plurality of directional antennas comprises receive logic for determining when a useful frame is being detected.

If, at 904, a frame is not detected (NO), the antenna remains in listen mode at 902. If, at 904, however, a frame is detected, at 906, the antenna where the frame is detected is switched to active mode. In active mode, the antenna is enabled to perform bi-directional communication. For example, a wireless transceiver can be switched to the antenna receiving the frame, receive and process the frame, and send an appropriate response for the frame. For example, if the frame is for a request to send (RTS) frame, a clear to send (CTS) frame or a poll frame may be sent in response. If another antenna is also receiving a useful frame, active mode 906 may be delayed until the other antenna is done receiving the frame. In an example embodiment, if two antennas are receiving RTS frames with priority values, the frames are responded to in sequence ordered by priority.

Figure 10:
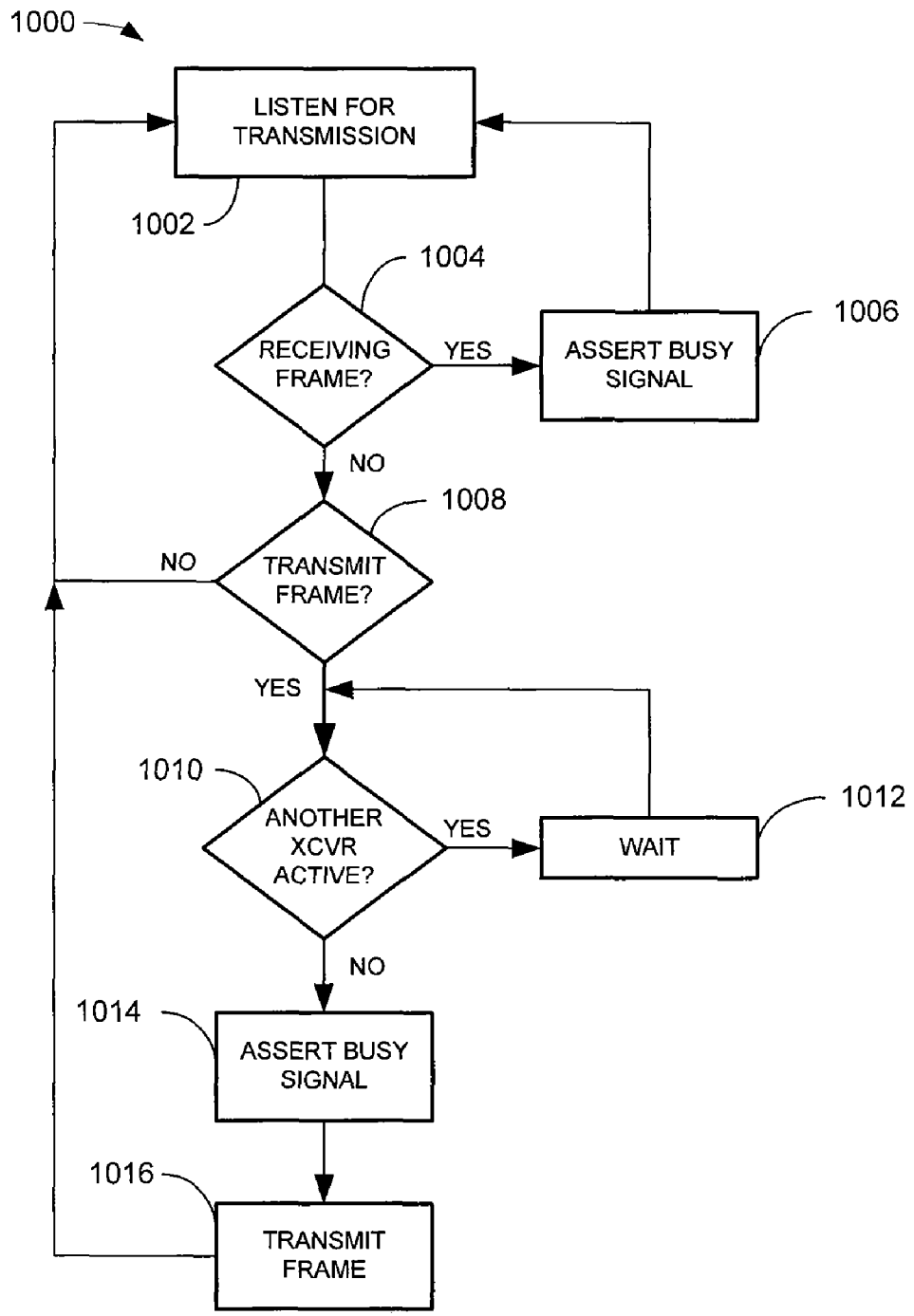
FIG. 10 illustrates a method for operating an apparatus comprising a plurality of wireless transceivers coupled to directional antennas.

FIG. 10 illustrates a method 1000 for operating an apparatus with a coordinated radio group, comprising a plurality of wireless transceivers coupled to directional antennas. This method prevents another radio in the group from transmitting while a radio in the group is receiving a useful frame. This method also enables a radio to reserve the group for a period of time, e.g. a service period, for bi-directional communications. Bi-directional communications may be initiated at any time and do not require scheduled antenna rendezvous times.

At 1002, the radio listens for useful frames. Every radio in the radio group can listen at the same time. At 1004, if a frame is detected on one of the antennas in the group (YES), at 1006 receive logic coupled to that antenna asserts a busy signal (for example, a RX_BUSY signal). When the RX_BUSY signal is asserted, no other radio within the radio group will transmit. Other radios within the radio group may also receive frames concurrently. A radio does not assert the RX_BUSY signal when receiving a "useless" frame, i.e. a frame that is not directed to the radio. In an example embodiment, another radio in the group can transmit when RX_BUSY is asserted if the transmission is high priority (e.g. necessary to meet quality of service "QoS" requirements or to meet other requirements, such as voice transmission requirements). If at 1004 no frames are being received (NO), at 1008 it is determined whether there is a frame to be transmitted on the antenna. If there are no frames for transmission (NO), the antenna remains in listen mode 1002.

If at 1008 it is determined that there is at least one frame for transmission (YES), at 1010 a determination is made whether there is another radio that is active (e.g. either sending or receiving a frame). If another transceiver is receiving a frame, at 1012 the transmitter waits until the other transceiver is not busy. If at 1010 a determination is made that no other radio is active (NO), at 1014 the radio asserts a busy signal to prevent other antennas within the group from transmitting. If the frame is an unacknowledged frame, for example a multicast transmission such as a beacon, the radio may acquire a single_frame_transmit semaphore before sending the frame. If the transmission is part of a bi-directional frame exchange with another radio, then a service_period_semaphore can be employed to prevent other radios in the radio group from transmitting until the service_period_semaphore is released.

Once the signal at 1014 has been asserted, at 1016 the frame is transmitted. If the frame was transmitted as part of a bi-directional burst, the busy signal asserted at 1014 can remain asserted until communications are completed; otherwise, the signal can be terminated.

Figure 11:
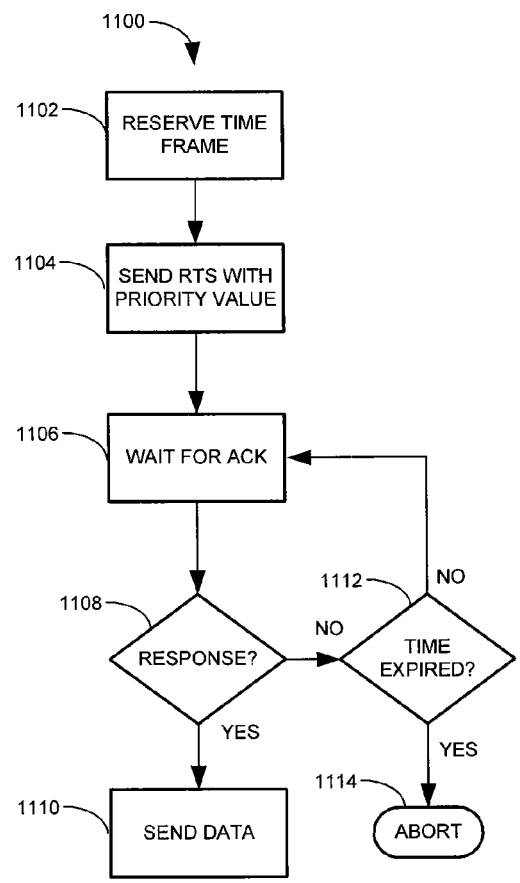
FIG. 11 illustrates an example method for a wireless device data employing a Request-to-Send (RTS)/Clear-To-Send (CTS)-type protocol to initiate sending.

FIG. 11 illustrates an example method 1100 for a wireless device data employing a Request to Send (RTS)/Clear To Send type protocol or non-polled contention protocol to initiate communications. Because the radio responding to the request may be currently busy (e.g. the receiving radio may also belong to a radio group, and another member of the group may be active), delayed responses such as delayed acknowledgements are employed in an example embodiment. In an 802.11 compatible protocol, once an RTS is sent, the recipient is expected to send a CTS within an SIFS (short interframe space). The receiving radio may be unable to meet this criterion if another radio in its radio group is active; therefore, a delayed response period is used to give the receiver a reasonable amount of time to respond.

At 1102, the radio initiating communication reserves a time frame from within its radio group. For example, a Service_Period Semaphore or other signal may be employed to inform the other radios that the radio is active and to inhibit other radios from the initiator's radio group from transmitting.

At 1104, after reserving the time frame at 1102, the initiator sends a request to send (RTS) frame. The RTS signal may include a priority value, allowing the recipient to sequence responses by priority.

At 1106, the initiator waits for a response from the recipient. The response may be a clear to send (CTS) frame. In an example embodiment, the response may be a poll frame that was solicited by sending the RTS.

If at 1108 a response was received (YES), at 1110 data is sent to the recipient. In an example embodiment, the data is sent piggybacked onto a poll frame. In another example embodiment, the data is piggybacked onto an acknowledgement (ACK) to a data frame.

At 1108, if no response was received (NO), then a timer is checked to determine if the time period allotted for responding has expired. If the time did not expire (NO) at 1112, the initiator continues to wait for a response. If time did expire at 1112, at 1114 the initiator aborts and may return to the initial state 1102.

Figure 12:
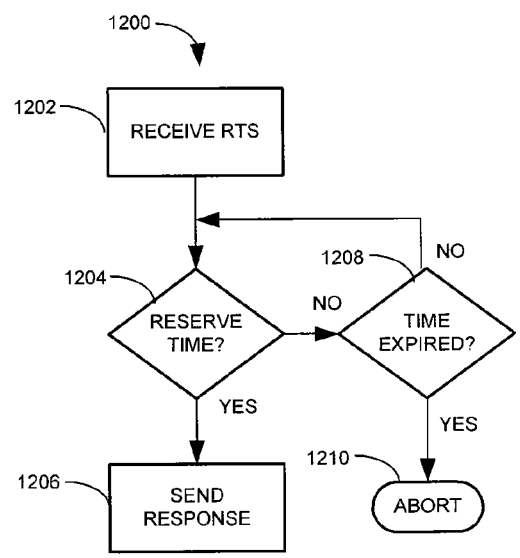
FIG. 12 illustrates an example method for a wireless device employing an RTS/CTS-type protocol for responding to an RTS frame.

FIG. 12 illustrates an example method 1200 for a wireless device employing an RTS/CTS type protocol for responding to a RTS frame. For example, methodology 1200 may be employed by a recipient of a frame initiated by an initiator employing methodology 1100 (FIG. 11).

At 1202, the recipient receives a RTS frame addressed to the recipient. The recipient ascertains if it can reserve a time period for responding to RTS frame. In an example embodiment, the recipient determines whether any other radio in its radio group is active. For example, the recipient may acquire a Service_Period semaphore.

At 1204 the recipient determines whether it was able to reserve the time period for responding to the RTS. If the recipient was able to reserve the time period (YES), at 1206 the recipient sends the response (such as CTS or a poll frame). If at 1204 the recipient was not able to reserve a time for responding, for example another radio in the recipient's radio coordination group is currently active (NO), at 1208 the recipient determines whether the time period for responding to the RTS has expired. If time did not expire at 1208 (NO) the recipient continues trying to reserve time for responding to the frame as illustrated at 1204. If at 1208 the recipient determines the time period for responding has expired (YES), it aborts as illustrated at 1210.

Figure 13:
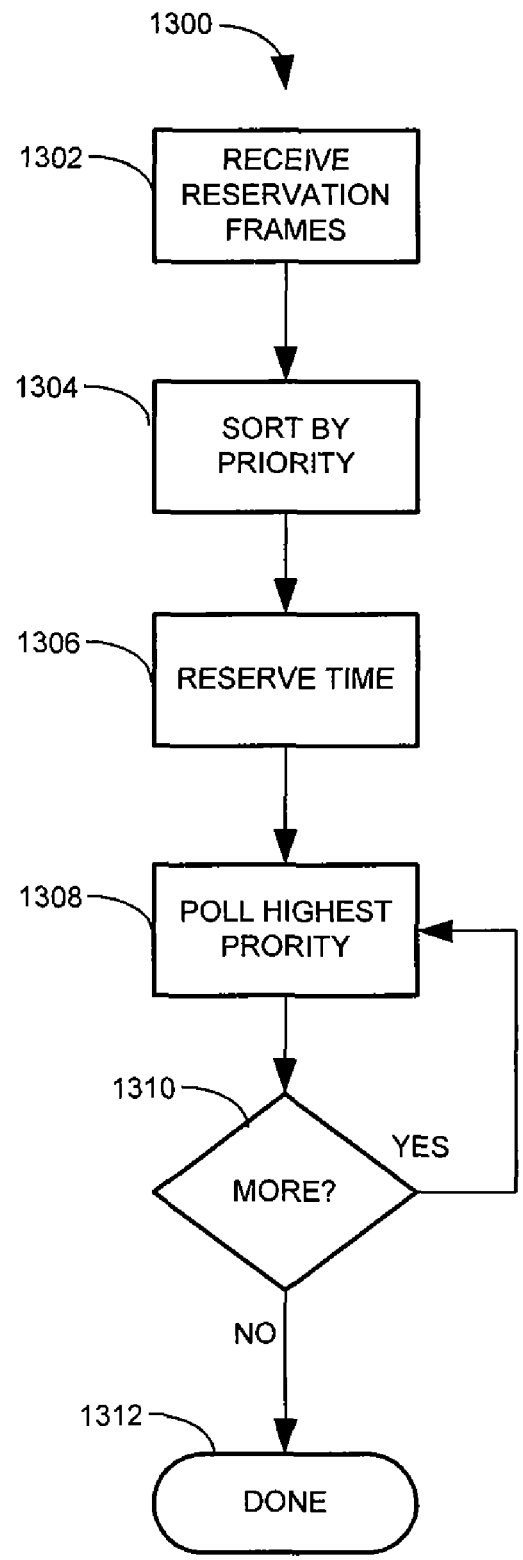
FIG. 13 illustrates an example method for polling multiple unscheduled service periods initiated by other wireless devices.

FIG. 13 illustrates an example method 1300 for polling multiple unscheduled service periods initiated by other wireless devices. This method is useful for performing unscheduled communications with a switched array antenna.

At 1302, reservation frames are received. One or more may be received concurrently. In an example embodiment, the reservation frames also contain a priority value.

At 1304, the reservation frames are sorted by priority. The priority may be obtained from the reservation frame. Alternatively, the priority value may be assigned by device, type of communication, or any other suitable parameter.

At 1306, a time period for responding to the reservations is reserved. For example, control logic may assert signals, such as a service_period semaphore, to prevent other radios within a radio coordination group from transmitting. The signal may be given a maximum time period before expiring or may be asserted as long as necessary to complete communications. In one embodiment, service_period semaphore requests are prioritized; the highest priority request is granted if multiple requests are pending.

At 1308, polling begins. Polls are sent based upon priority, with the highest priority communication being polled first. After polling the highest priority request, if more requests are still pending (YES) at 1310, at 1308 the next highest priority communications are initiated. Steps 1308, 1310 may be executed until communications are completed with all devices sending reservation frames. In one embodiment, the service_period semaphore must be relinquished and re-acquired at step 1310. If at 1310 no more requests are still pending (NO), the process completes at 1312.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications, and variations that fall within the spirit and scope of the appended claims, interpreted in accordance with the breadth to which they are fairly, legally, and equitably entitled.

The invention claimed is:

1. An apparatus, comprising:
a wireless transceiver;
an antenna array coupled to the wireless transceiver, the antenna array comprising an omni-directional antenna and at least one narrow-beam sector antenna; and
control logic operable to control the operation of the wireless transceiver and the antenna array;
wherein the control logic is configured to couple the omni-directional antenna to the wireless transceiver so as to receive a reservation frame from a peer wireless transceiver while the at least one directional antenna is idle;
wherein the control logic is configured to determine a directional antenna selected from the at least one directional antenna to employ so as to communicate with the peer wireless transceiver; and
wherein the control logic sends a poll frame to the peer wireless transceiver to initiate communications with the peer wireless transceiver.

2. The apparatus set forth in claim 1, wherein the wireless transceiver receives data on the omni-directional antenna at a lower data rate than data received on the at least one directional antenna.

3. The apparatus set forth in claim 1, wherein the reservation frame is a request to send frame and the poll frame is a clear to send frame.

4. The apparatus set forth in claim 1, wherein the control logic is configured to send a beacon frame on the at least one directional antenna, wherein the beacon frame comprises an antenna identifier.

5. The apparatus set forth in claim 4, wherein the beacon further comprises data identifying a beacon frame contention period that the wireless transceiver will be receiving on the at least one directional antenna.

6. An apparatus, comprising:
an antenna array comprising a plurality of directional antennas, each of the plurality of directional antennas further comprising receive logic;
a wireless transceiver coupled to the antenna array;
control logic operable to control the operation of the wireless transceiver and the antenna array;
wherein the control logic is configured to operate the wireless transceiver in a listen mode, in which each antenna simultaneously listens for a start of a radio transmission; and
wherein the control logic is configured to operate in an active mode to couple the wireless transceiver to a selected antenna of the plurality of directional antennas responsive to receive logic on the selected antenna detecting a start of frame reception on the selected antenna.

7. The apparatus as set forth in claim 6, wherein the control logic is configured to determine whether the frame received on the selected antenna is a reservation frame directed to the transceiver; and
wherein the control logic is responsive to determining the frame received on the selected antenna is a reservation frame to send a responsive confirming a reservation on the selected antenna.

8. The apparatus set forth in claim 7, wherein the reservation frame received on the selected antenna is a request to send frame and the frame sent to confirm the reservation is a clear to send frame.

9. The apparatus set forth in claim 8, wherein the frame sent to confirm the reservation is a poll frame to initiate communication with a wireless transceiver sending the request to send frame.

10. The apparatus set forth in claim 6, wherein the control logic is configured to periodically send a beacon frame on each of the plurality of directional antennas, wherein the beacon frame comprises an antenna identifier.

11. An apparatus, comprising:
a first wireless transceiver;
a first directional antenna coupled to the first wireless transceiver;
a second wireless transceiver;
a second directional antenna coupled to the second wireless transceiver;
control logic coupled to the first wireless transceiver and the second wireless transceiver;
wherein the first wireless transceiver and second wireless transceiver can concurrently receive wireless signals that are spatially separated;
wherein the first wireless transceiver asserts a signal while communicating with another wireless device; and
wherein the control logic is configured to prevent the second wireless transceiver from transmitting while the first wireless transceiver is asserting the signal.

12. The apparatus of claim 11, wherein the first wireless transceiver and second wireless transceiver operate on the same band.

13. The apparatus of claim 11, wherein the control logic is distributed among the first and second wireless transceivers.

14. The apparatus of claim 11, wherein the first wireless transceiver is configured to listen for a reservation frame from another wireless device while not communicating with another wireless device.

15. The apparatus of claim 14, wherein the control logic is responsive to a reservation frame being received by the first wireless transceiver to determine whether the second wireless transceiver is idle; and
wherein the control logic is configured to enable the first wireless transceiver to respond to the reservation frame while the second wireless transceiver is idle.

16. The apparatus of claim 15, wherein the first wireless transceiver sends a poll frame to solicit a transmission from the wireless device.

17. The apparatus of claim 16, wherein the reservation frame is a request to send (RTS) frame and the poll frame is a clear to send (CTS) frame.

18. The apparatus of claim 16, wherein the reservation frame contains a transmission opportunity request.

19. The apparatus of claim 11, wherein the reservation frame is a request to send (RTS) frame comprising a priority value; and
wherein the control logic is configured to sequence polls responsive to reservation frames based on priority.

20. The apparatus of claim 11, wherein the control logic is configured to defer sending an acknowledgement (ACK) to a data frame received by the first wireless transceiver while the second wireless transceiver is actively communicating with another wireless device; and
wherein the control logic is configured to send a delayed ACK via the first wireless transceiver responsive to the data frame while the second wireless transceiver is idle.

21. The apparatus of claim 11, wherein a first identifier is associated with the first antenna and a second identifier is associated with the second antenna; and
wherein the control logic is configured to send a first message comprising the first identifier via the first wireless transceiver; and
wherein the control logic is configured to send a second message comprising the second identifier via the second wireless transceiver.

22. A method, comprising:
receiving a frame by a first wireless transceiver belonging to a coordinated radio group;
asserting a signal to other wireless transceivers belonging to the coordinated group indicating that a frame is being received by the first wireless transceiver;
deferring transmission by the other wireless transceivers belonging to the coordinated radio group until the signal is de-asserted;
selecting a wireless device for bi-directional communications by the first wireless transceiver;
determining whether the other wireless transceivers belonging to the coordinated radio group are idle;
reserving a time period for communicating with the wireless device responsive to determining the other wireless transceivers belonging to the coordinated radio group are idle;
signaling the other wireless transceivers belonging to the coordinated radio group that the first wireless device will be active during the time period;
sending a request to send (RTS) frame to the wireless device during the time period; and
waiting a predefined time period for a response from the wireless device.

23. The method according to claim 22, wherein the signal is asserted responsive to determining the frame is addressed to the first wireless transceiver.

24. The method according to claim 22, wherein the signal is de-asserted responsive to determining the frame is not addressed to the first wireless transceiver.

* * * * *